United States Patent [19]

Hathaway, Jr.

[11] 3,729,224
[45] Apr. 24, 1973

[54] PICKUP TRUCK CAMPER DEVICE
[76] Inventor: Milton R. Hathaway, Jr., 30 Parlee Road, Chelmsford, Mass. 01824
[22] Filed: Sept. 21, 1971
[21] Appl. No.: 182,429

[52] U.S. Cl.................................296/23 MC, 296/99
[51] Int. Cl. ..............................................B60p 3/32
[58] Field of Search.....................296/23 R, 23 MC, 296/99

[56] References Cited

UNITED STATES PATENTS 3,325,205   6/1967   Girski................................296/23 R Primary Examiner—Philip Goodman
Attorney—Robert E. Kleve

[57] ABSTRACT

This invention comprises a camper and pickup truck device which has a compartment passageway structure mounted to the rear of the pickup truck. The passageway structure is slidably adapted to fit into an opening in different size pickup truck cabs. The outer edge of the compartment passageway structure abutts the front wall of the camper. The front wall of the camper has a passageway therethrough. A pair of doors are pivotally mounted to the inner edge of the front wall of the passageway structure and are adapted to pivot forward into the cab to open the passageway between the camper and the cab of the pickup truck.

2 Claims, 3 Drawing Figures

Patented April 24, 1973
3,729,224
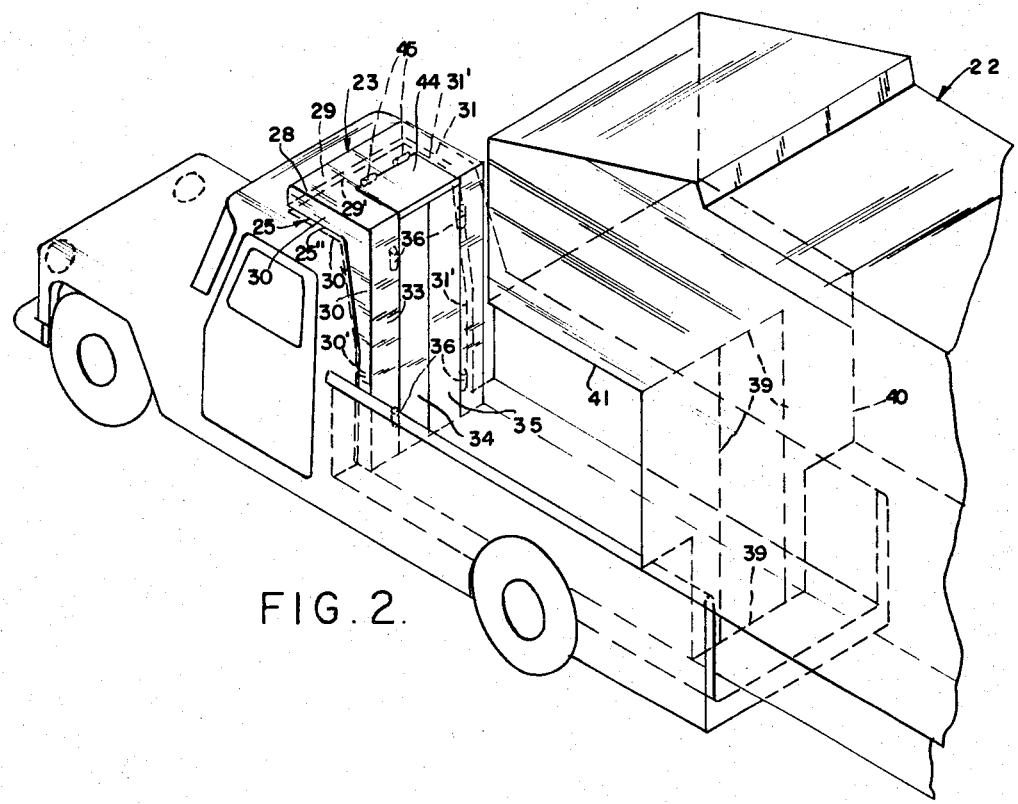
FIG. 2.
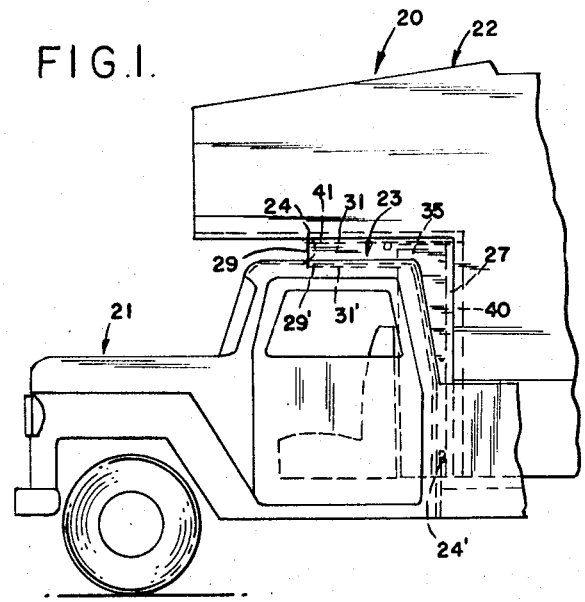
FIG.I.
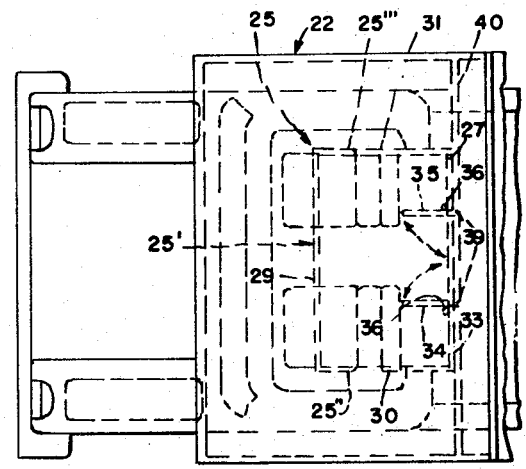
FIG.3.
INVENTOR
MILTON R. HATHAWAY, JR.
BY Robert E. Kleve
ATTORNEY

PICKUP TRUCK CAMPER DEVICE

The invention relates to pickup truck and camper devices.

This invention is also related to my co-pending patent application Ser. No. 53,971, filed July 10, 1970, entitled Pickup Truck and Trailer Passageway Device.

It is an object of the invention to provide a novel pickup truck camper device wherein the cab of the pickup truck has an opening with a compartment passageway structure slid therein and permanently attached to the cab with the compartment passageway structure abutting the front wall of the camper and providing communication therethrough.

It is a further object of the invention to provide a compartment passageway structure which may be permanently attached to various different cabs of pickup trucks and which has a door therein, with the door opening and aligning with an opening in the camper to provide a walkway communication therethrough.

It is another object of the invention to provide a compartment passageway structure which is permanently attached to the cab of the pickup truck and has a door opening therein and which structure remains attached to the cab, and when the camper is removed, a door is provided to close the passageway opening in the passageway structure.

Further objects and advantages of the invention will become apparent as the description proceeds and when taken in conjunction with the accompanying drawing wherein:

FIG. 1 is a side elevational view of the pickup truck and camper invention.

FIG. 2 is a perspective view of the pickup truck and camper invention illustrating the compartment passageway structure permanently attached to the cab of the pickup truck, with a fragmentary showing of the camper detached from the truck.

FIG. 3 is a top plan view of the pickup truck and camper invention.

Briefly stated, the invention comprises a camper and pickup truck invention having a compartment passageway structure permanently mounted to the rear of the cab of the pickup truck which compartment passageway structure is adjusted so that its outer edge abuts the front wall of the camper. The said camper has an opening in its front wall and said compartment passageway structure has a door which aligns with the camper opening to provide a walkway communication therethrough. The door also serves to close the passageway structure opening when the camper is detached from the pickup truck.

Referring more particularly to the drawing, in FIG. 1, the camper and pickup truck invention 20 is illustrated having a conventional pickup truck 21 and a conventional camper 22, with the campartment passageway structure 23 between the cab 24 of the truck and the camper permanently mounted to the cab 24 of the truck.

The cab 24 has a cut out 25 in the top 26 and back of the cab. The cut out 25 extends along an edge indicated by line 25' across the top 26 of the cab 24 of the truck, and along parallel edges indicated by lines 25" and 25"' rearwardly from the lateral line 25' along the top of the cab and downward along the back 27 of the cab to the bottom 24' of the cab.

The compartment passageway structure 23 has a rectangular top panel 28, a front flange 29, and a pair of side flanges 30 and 31. The front flange 29 and side flanges 30 and 31 extend downward into the cab through the opening 25. The rearward portion 32 of the side flanges 30 and 31 extend forward into the cab, through the opening 25 in the rear wall 27 of the cab. The compartment passageway structure 23 also has a back wall 33 with a doorway in the back wall, and with a pair of doors 34 and 35 pivotally mounted, in the doorway, to the back wall 33 by hinges 36. The doors 34 and 35 pivot about the vertical axes of the hinges to enable the doors 34 and 35 to open and close the doorway, along the path of the arrows 37 and 38.

The inner edges 29', 30', and 31' of the compartment passageway structure project a short distance in the interior of the cab 24.

The camper 22 has a rectangular doorway 39 along its front wall 40 which aligns with the compartment passageway doors 34 and 35, with the rear wall 33 of the compartment passageway structure 23 flush with the front wall 40 of the camper when the camper is attached, so that persons may walk between the camper and cab of the truck by walking through the passageway or doorway 39 and through the doorway in the front wall 40 of the camper by opening the doors 34 and 35.

The compartment passageway structure 23 is adapted to be mounted to cabs of pickup trucks wherein the cabs have somewhat different sizes and configurations and also is adapted to abut or engage campers, wherein the campers may have somewhat different dimensions, with the passageway structure fitting flush against the front wall 40 of the camper and flush against the top under panel 41 of the camper.

The camper, pickup truck, and compartment passageway structure are assembled by first placing the passageway structure 23 loose in the opening 25 of the cab of the truck. Thereafter the camper 22 is installed in its intended location on the box of the truck, once the camper has been positioned exactly, the passageway structure 23 will be slid along or in the opening 25 until the top wall 28 and rear wall 33 of the passageway structure are flush with and abut the top wall 41 and rear wall 40 of the camper.

The inner edges 29', 30', and 31' of the compartment passageway structure project a short distance into the interior of the cab to provide sufficient length or depth to the flanges 29, 30, and 31 so that the compartment passageway structure may be slid a certain amount in or out of the opening 21 in the cab to adjust the passageway structure 23 to fit against the camper, and while the flanges 29, 30, and 31 remain engaged to the side edges 25', 25", and 25"' of the cab, so that the flanges 29, 30, and 31 may be welded to edges 25', 25", and 25"' of the cab to seal the flanges to the cab of the truck, once the passageway structure has been adjusted.

The doors 34 and 35, by being mounted to the rear wall of the passageway structure may pivot into the space between the cab and camper so as to pivot behind the seats 42 and 43 without interfering with the seats or other structure of the cab.

The doors 34 and 35 also may have suitable latching means so that they may be locked together as shown in FIG. 2, to remain closed when the camper is detached from the truck, and the truck is being used without the camper. Also when camper 22 is detached from the pickup truck 21, the compartment passageway structure 23 will remain permanently attached to the cab 24 of the truck.

Also the top panel 28 of the passageway structure may have a panel 44 which is pivotally mounted therein to pivot about a pair of hinges 45 to open the compartment passageway structure along its top for more head room when the camper is attached. After the doors 34 and 35 have been pivoted open to their position shown in FIG. 3, the panel 44 may be pivoted downward about its hinges 45, from its position shown in FIG. 2 for opening the panel 44. The panel 44 may be pivoted open approximately 180°, and it may be locked in its fully closed position or in its fully open position by suitable latching means.

The horizontal under panel 41 of the camper may also be cut out to enlarge the passageway in the camper forwardly to provide more head room, with the cut out in the horizontal panel 41 aligning with the outline of the top panel 44.

Thus it will be seen that a novel camper and pickup truck device has been provided with a compartment passageway structure which may be easily installed and adjusted to cabs of pickup trucks and to the camper mounted to the truck, wherein the cabs have somewhat different sizes and shapes and the camper mounted therein has somewhat different dimensions.

It will be obvious that various changes and departures may be made to the invention without departing from the spirit thereof, and accordingly it is not intended that the invention be limited to that specifically described in the specification or as illustrated in the drawing but only as set forth in the appended Claims wherein:

What is claimed is:

1. A camper and pickup truck device comprising a camper, a pickup truck, a compartment passageway structure said pickup truck having a cab with an opening in the top and back of the cab, said compartment passageway structure having a top wall and front and side walls projecting into said opening in the cab, whereby said camper may be attached to said pickup truck, and said compartment passageway structure may be slidably adjusted to abut the camper along its forward wall portions, and once adjusted, said passageway structure may be permanently fixed to said cab of said truck, said compartment passageway structure having a doorway along its rear wall, said camper having a doorway along its forward wall portions which align with the passageway structure doorway.

2. A camper and pickup truck device according to claim 1 wherein said passageway structure has a pair of pivotally mounted doors mounted in said doorway in said rear wall of said passageway structure, said door being adapted to pivot about vertical axis forward toward the front of the truck for opening the passageway structure doorway.

* * * * *